United States Patent
Ko et al.

(10) Patent No.: US 6,804,797 B2
(45) Date of Patent: Oct. 12, 2004

(54) METHOD OF VERIFYING DEFECT MANAGEMENT AREA INFORMATION OF DISC AND TEST APPARATUS FOR PERFORMING THE SAME

(75) Inventors: Jung-wan Ko, Yongin (KR); Hyun-kwon Chung, Kyungki-do (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 437 days.

(21) Appl. No.: 09/805,437

(22) Filed: Mar. 14, 2001

(65) Prior Publication Data

US 2001/0034862 A1 Oct. 25, 2001

Related U.S. Application Data

(60) Provisional application No. 60/195,471, filed on Apr. 10, 2000.

(30) Foreign Application Priority Data

Apr. 8, 2000 (KR) ........................................ 2000-18506

(51) Int. Cl.[7] ............................................... G06F 11/30
(52) U.S. Cl. ..................... 714/42; 369/53.1; 369/53.13; 369/53.15
(58) Field of Search .................. 714/42, 25; 369/47.14, 369/53.13, 53.12, 53.31, 53.44, 53.1, 53.15; 360/31

(56) References Cited

U.S. PATENT DOCUMENTS

| | | | | |
|---|---|---|---|---|
| 4,631,723 A | * | 12/1986 | Rathbun et al. | ............. 714/710 |
| 5,568,454 A | * | 10/1996 | Shima et al. | ............. 369/13.28 |
| 5,966,358 A | * | 10/1999 | Mine | ........................ 369/47.14 |
| 6,088,664 A | * | 7/2000 | MacPherson | ............... 702/183 |

(List continued on next page.)

FOREIGN PATENT DOCUMENTS

| | | |
|---|---|---|
| EP | 1 118 993 | 7/2001 |
| JP | 55-064660 | 5/1980 |
| JP | 03-016025 | 1/1991 |
| JP | 05-307836 | 11/1993 |
| JP | 10-144011 | 5/1998 |
| WO | 00/16329 | 3/2000 |

OTHER PUBLICATIONS

OSTA.MultiRead2: Test Plan for MultiRead2. Dec. 6, 1999. pp. 1–14.*
Japanese Office Action for Japanese Application No. 2001–110581 dated Feb. 3, 2004.
U.S. patent application Ser. No. 09/805,443, Ko et al., filed Mar. 14, 2001.
U.S. patent application Ser. No. 09/805,436, Ko et al., filed Mar. 14, 2001.
U.S. patent application Ser. No. 09/805,446, Ko et al., filed Mar. 14, 2001.

(List continued on next page.)

*Primary Examiner*—Robert Beausoliel
*Assistant Examiner*—Yolanda L. Wilson
(74) *Attorney, Agent, or Firm*—Staas & Halsey, LLP

(57) ABSTRACT

A method of verifying that a disc recording and reproducing apparatus normally generates or updates defect management area (DMA) information in a supplementary spare area extension mode, and a test apparatus therefore. The method includes extending the supplementary spare area of a test disc in the recording and reproducing apparatus using the test disc with test reference information and generating test information from the test disc; and comparing reference information expected from the test reference information with the test information and providing the result of verification of the test information. Accordingly, a DMA information generation or updating function of the recording and reproducing apparatus upon the extension of the supplementary spare area can be easily verified.

78 Claims, 9 Drawing Sheets

U.S. PATENT DOCUMENTS

| | | | | |
|---|---|---|---|---|
| 6,119,239 | A | * | 9/2000 | Fujii .......................... 713/320 |
| 6,154,858 | A | * | 11/2000 | Ottesen et al. ................ 714/42 |
| 6,467,054 | B1 | * | 10/2002 | Lenny ......................... 714/42 |
| 6,526,522 | B1 | * | 2/2003 | Park et al. ..................... 714/8 |
| 6,542,450 | B1 | * | 4/2003 | Park ........................ 369/53.15 |
| 6,601,201 | B1 | * | 7/2003 | Kato ........................... 714/724 |
| 2003/0133379 | A1 | * | 7/2003 | Shin ........................ 369/53.17 |
| 2003/0135800 | A1 | * | 7/2003 | Kim et al. .................. 714/719 |

OTHER PUBLICATIONS

U.S. patent application Ser. No. 09/805,447, Ko et al., filed Mar. 14, 2001.

U.S. patent application Ser. No. 09/805,439, Ko et al., filed Mar. 14, 2001.

U.S. patent application Ser. No. 09/805,438, Ko et al., filed Mar. 14, 2001.

U.S. patent application Ser. No. 09/805,448, Ko et al., filed Mar. 14, 2001.

U.S. patent application Ser. No. 09/805,444, Ko et al., filed Mar. 14, 2001.

* cited by examiner

FIG. 1

PRIOR ART

| DMA1 | DDS |
| --- | --- |
| | PDL |
| | SDL |
| RESERVED | |
| DMA2 | DDS |
| | PDL |
| | SDL |
| RESERVED | |
| USER DATA AREA | |
| RESERVED | |
| DMA3 | DDS |
| | PDL |
| | SDL |
| RESERVED | |
| DMA4 | DDS |
| | PDL |
| | SDL |
| RESERVED | |

FIG. 3A

| Class | Items | | Byte Position | of bytes | Expected value |
|---|---|---|---|---|---|
| DMA | Error condition of DMA | DMA1 | NA | NA | No uncorrectable error |
| | | DMA2 | NA | NA | No uncorrectable error |
| | | DMA3 | NA | NA | No uncorrectable error |
| | | DMA4 | NA | NA | No uncorrectable error |
| | DDS/PDL and SDL Update counters | DDS/PDL update counter in DDS1 | 4 to 7 | 4 | M+k |
| | | DDS/PDL update counter in SDL1 | 16 to 19 | 4 | M+k |
| | | DDS/PDL update counter in DDS2 | 4 to 7 | 4 | M+k |
| | | DDS/PDL update counter in SDL2 | 16 to 19 | 4 | M+k |
| | | DDS/PDL update counter in DDS3 | 4 to 7 | 4 | M+k |
| | | DDS/PDL update counter in SDL3 | 16 to 19 | 4 | M+k |
| | | DDS/PDL update counter in DDS4 | 4 to 7 | 4 | M+k |
| | | DDS/PDL update counter in SDL4 | 16 to 19 | 4 | M+k |
| | | SDL update counter in SDL1 | 4 to 7 | 4 | N+k |
| | | SDL update counter in SDL2 | 4 to 7 | 4 | N+k |
| | | SDL update counter in SDL3 | 4 to 7 | 4 | N+k |
| | | SDL update counter in SDL4 | 4 to 7 | 4 | N+k |
| | Contents of DMA | DMA1 | NA | | Should be identical |
| | | DMA2 | NA | | Should be identical |
| | | DMA3 | NA | | Should be identical |
| | | DMA4 | NA | | Should be identical |

FIG. 3B

| Class | Items | | Byte Position | of bytes | Expected value | |
|---|---|---|---|---|---|---|
| DDS | DDS Identifier | | 0 to 1 | 2 | 0A0Ah | |
| | reserved | | 2 | 1 | 00h | |
| | Disc Certification flag | | 3 | 1 | b7 | 0b |
| | | | | | b6-b2 | All 0b |
| | | | | | b1 | 1b |
| | | | | | b0 | X |
| | DDS/PDL update counter | | 4 to 7 | 4 | M+k | |
| | Number of Groups | | 8 to 9 | 2 | 0001h | |
| | Number of zones | | 10 to 11 | 2 | 0023h | |
| | reserved | | 12 to 79 | 68 | All 00h | |
| | Location of Primary spare area | | 80 to 87 | 8 | b63-b56 | 00h |
| | | | | | b55-b32 | 031000h |
| | | | | | b31-b24 | 00h |
| | | | | | b23-b0 | 0341FFh |
| | Location of LSN0 | | 88 to 91 | 4 | b31-b24 | 00h |
| | | | | | b23-b0 | - |
| | reserved | | 92 to 255 | 164 | All 00h | |
| | Start LSN for each zone | Zone1 | 256 to 259 | 140 | b31-b24 | 00h |
| | | Zone2 | 260 to 263 | | b23-b0 | - |
| | | ... | ... | | b31-b24 | 00h |
| | | | | | b23-b0 | - |
| | | | | | ... | ... |
| | | Zone34 | 392 to 395 | | b31-b24 | 00h |
| | | | | | b23-b0 | - |
| | reserved | | 396 to 2047 | 1652 | All 00h | |

FIG. 3C

| Class | Items | Byte Position | of bytes | Expected value |
|---|---|---|---|---|
| PDL | PDL Identifier | 0 to 1 | 2 | 0001h |
| | Number of entries in PDL | 2 to 3 | 2 | $E_{PDL}$ |
| | Integrity of PDL entries — First PDL entry | 4 to 7 | 4 | b31-b30 / b23-b0 |
| | Second PDL entry | 8 to 11 | 4 | b31-b30 / b23-b0 |
| | ... | ... | ... | ... |
| | Last PDL entry | n to n+3 | 4 | b31-b30 / b23-b0 |
| | Size of PDL | | | $4 \times E_{PDL} + 4$ |
| | Un-used area | n+4 to 30719 | | FFh |

FIG. 3D

| Class | Items | Byte Position | of bytes | Expected value | |
|---|---|---|---|---|---|
| SDL | SDL identifier | 0 to 1 | 2 | 0002h | |
| | reserved | 2 to 3 | 2 | 00h | |
| | SDL Update counter | 4 to 7 | 4 | N+k | |
| | Start sector number of SSA | 8 to 11 | 4 | b31-b24 | 00h |
| | | | | b23-b0 | - |
| | Total number of logical sectors | 12 to 15 | 4 | | |
| | DDS/PDL Update counter | 16 to 19 | 4 | M+k | |
| | Spare area full flag | 20 | 1 | b7-b2 | All 0b |
| | | | | b1 | - |
| | | | | b0 | - |
| | reserved | 21 | 1 | 00h | |
| | Number of entries in SDL | 22 to 23 | 2 | $E_{SDL}$ | |
| | Integrity of SDL entries — First SDL entry | 24 to 31 | 8 | b63-b56 | 00h |
| | | | | b55-b32 | |
| | | | | b23-b0 | |
| | Second SDL entry | 32 to 39 | 8 | b62 | |
| | | | | b55-b32 | |
| | | | | b23-b0 | |
| | ... | ... | ... | ... | ... |
| | Last SDL entry | m to m+7 | 8 | b62 | |
| | | | | b55-b32 | |
| | | | | b23-b0 | |
| | Size of PDL | | | $8 \times E_{SDL}+24$ | |
| | Un-used SDL area | m+8 to 32767 | | FFh | |

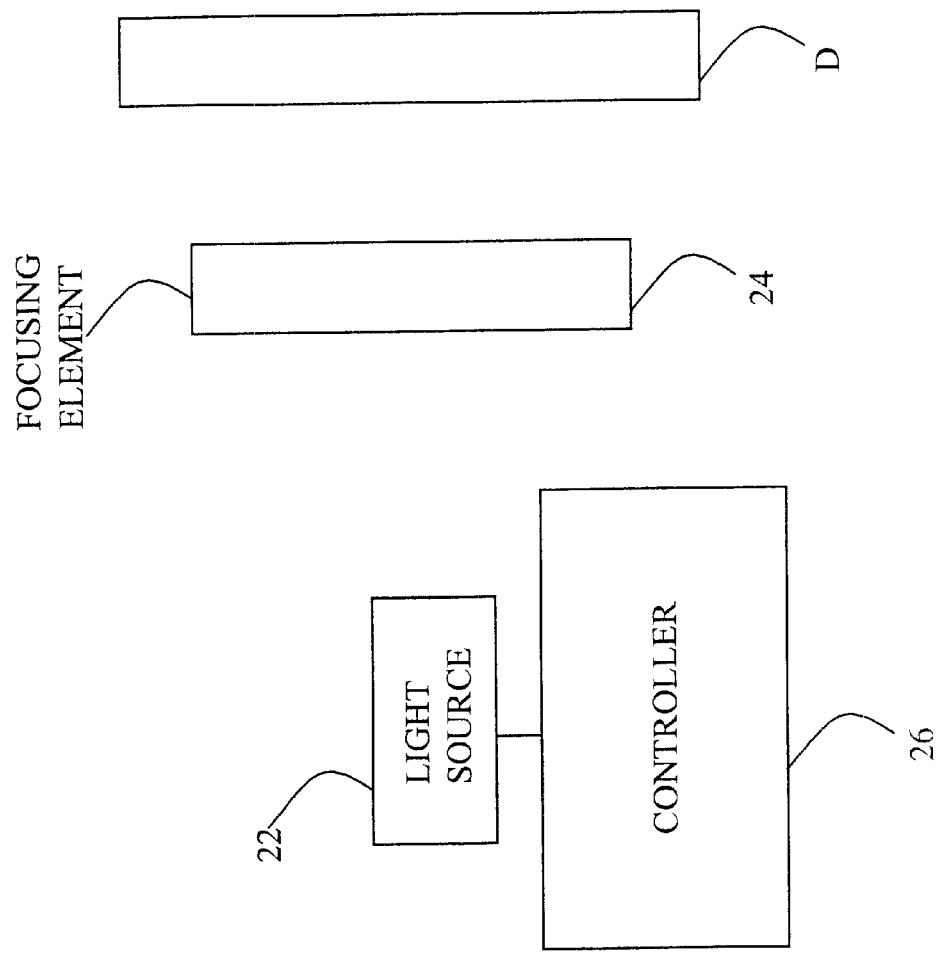

METHOD OF VERIFYING DEFECT MANAGEMENT AREA INFORMATION OF DISC AND TEST APPARATUS FOR PERFORMING THE SAME

CROSS-REFERENCE TO RELATED APPLICATIONS

This application claims the benefit of Korean Application No. 00-18506, filed Apr. 8, 2000, in the Korean Patent Office and U.S. Provisional Application No. 60/195,471, filed Apr. 10, 2000 in the U.S. Patent & Trademark Office the disclosures of which are incorporated herein by reference.

BACKGROUND OF THE INVENTION

1. Field of the Invention

The present invention relates to an apparatus which can record information on and reproduce information from a recording and reproducing disc, and more particularly, to a method of verifying that a disc recording and reproducing apparatus normally generates or updates defect management area (DMA) information of a disc, and a test apparatus for performing the same.

2. Description of the Related Art

A recording and reproducing disc is an optical disc, which information is recorded on and reproduced from using light such as a laser beam, for example, a digital versatile disc random access memory (DVD-RAM). A DVD-RAM is a rewritable disc. According to "DVD Specifications for Rewritable Disc Part 1 Physical Specifications Version 2.0," DVD-RAM includes four DMAs, i.e., DMA1, DMA2, DMA3 and DMA4, on each side thereof for managing the defects thereon.

As shown in FIG. 1, DMA1 and DMA2 are located in a lead-in area near the inner diameter of a disc, and DMA3 and DMA4 are located in a lead-out area near the outer diameter of the disc. Each DMA is followed by a reserved sector.

A disc definition structure (DDS), a primary defect list (PDL) and a secondary defect list (SDL) are stored in the DMA. A DDS includes information on the format structure of a disc, for example, a disc certification flag, a DDS/PDL update counter and a start logical sector number of each zone. A PDL includes information on all defective sectors detected on the disc during initialization of the disc. An SDL includes information on the sector number of each first sector in defective blocks (error-correction code (ECC) blocks) occurring while the disc is in use, information on the sector number of each first sector in spare blocks which are used to replace defective blocks and information on a spare area.

Some information included in the DMA can be immediately read and used. On the other hand, the DMA includes information which varies with the positions and the number of defects on a disc. In addition, some information, for example, the position information of the start sector number of each zone or the position information of a logical sector number 0, can be obtained by performing an algorithm based on defect information registered in the DMA.

Four DMAs exist on each side of a disc to prevent erroneous defect management due to errors in the DMA information. Since such DMA information is closely related to a physical data sector, a recording medium such as a movable optical disc may not be compatible with two different disc recording and reproducing apparatuses when the DMA information is incorrectly written or read.

This is because, when the recording and reproducing architecture of a disc recording and reproducing apparatus (for example, a DVD-RAM recording and reproducing apparatus) is divided into a file system layer, a host interface layer for interfacing a host computer with the recording and reproducing apparatus, a physical disc recording and reproducing apparatus (or a disc drive unit) layer for recording and reproducing physical signals, and a recording medium layer, writing and reading of the DMA information is performed in the physical disc recording and reproducing apparatus layer and the layers therebelow.

In an actual file system, user information to be recorded or reproduced is transmitted to a disc recording and reproducing apparatus based on only a logical sector number, and the disc recording and reproducing apparatus converts the logical sector number into a physical sector number to record or reproduce the user information. In this case, DMA information is used. Accordingly, when the DMA information has erroneously been read or written in a given disc recording and reproducing apparatus, data cannot be correctly read or written in another recording and reproducing apparatus.

Accordingly, a method of verifying that a disc recording and reproducing apparatus correctly reads DMA information recorded on a disc and correctly records DMA information on the disc for generation or update of DMA information is desired.

SUMMARY OF THE INVENTION

To solve the above problem, a first object of the present invention is to provide a method of verifying that a disc recording and reproducing apparatus normally generates or updates defect management area (DMA) information in a supplementary spare area extension mode.

A second object of the present invention is to provide a method of verifying that a disc recording and reproducing apparatus normally generates or updates the DMA information of a disc, which is generated using a blank disc and a DMA mirror file used for a test reference, in a supplementary spare area extension mode.

A third object of the present invention is to provide a test apparatus for verifying that a disc recording and reproducing apparatus normally generates or updates DMA information in a supplementary spare area extension mode.

To achieve the above and other objects of the present invention, there is provided a method of verifying a DMA information generation/updating function of a recording and reproducing apparatus which records information on or reproduces information from a disc with DMA information. The method includes extending the supplementary spare area of a test disc in a recording and reproducing apparatus using the test disc with test reference information and generating test information from the test disc, and comparing reference information expected from the test reference information with the test information and providing the result of verification of the test information.

To achieve the above and other objects of the present invention, there is also provided an apparatus for testing a DMA information generation/updating function of a recording and reproducing apparatus which records information on or reproduces information from a disc with DMA information. The apparatus includes a test disc with test reference information; a reference drive generating test information from the test disc after the recording and reproducing apparatus performs a process using the test disc in a supplementary spare area extension mode; and a verifier comparing reference information, which is expected from the test reference information, with the test information and providing the result of verifying the test information.

BRIEF DESCRIPTION OF THE DRAWINGS

The above objects and advantages of the present invention will become more apparent by describing in detail preferred embodiments thereof with reference to the attached drawings in which:

FIG. 1 shows the schematic configuration of a rewritable disc;

FIGS. 3A through 3D are examples of detailed check lists for verification which is possessed by the verifier of FIG. 2;

FIG. 6 is a block diagram of the drive to be tested shown in FIG. 2.

DETAILED DESCRIPTION OF THE INVENTION

Figure 2:
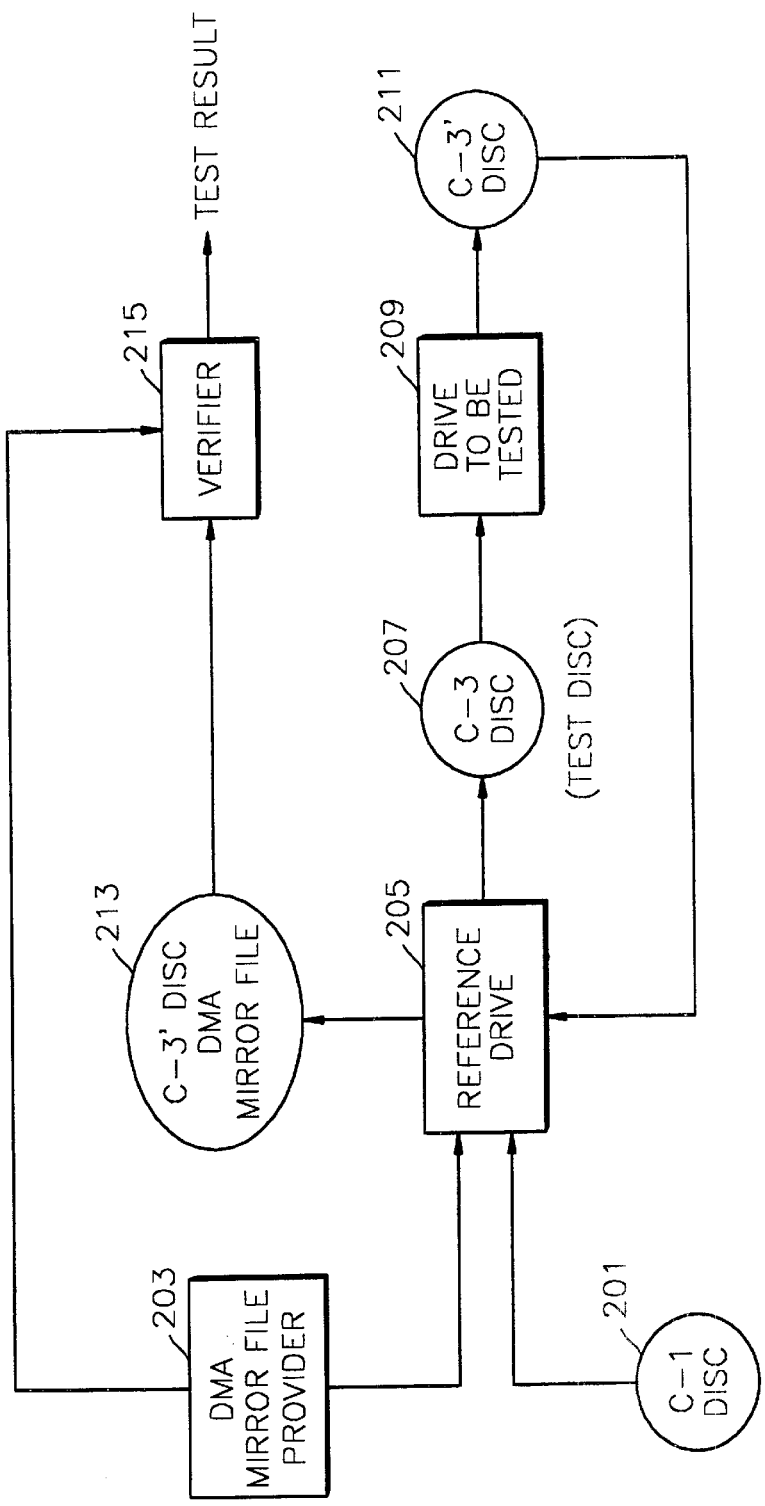
FIG. 2 is a block diagram showing the functioning of a test apparatus according to the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Referring to FIG. 2, a test apparatus includes a C-1 disc 201, a defect management area (DMA) mirror file provider 203, a reference drive 205, a C-3 disc 207, a drive to be tested 209, a C-3' disc 211, a C-3' disc DMA mirror file 213 and a verifier 215.

The C-1 disc 201 is a test disc which is made to have intentional physical defects for the purpose of testing a disc drive which can record information on or reproduce information from a rewritable disc such as digital versatile disc random access memory (DVD-RAM), and is substantially a blank disc on which no user data is recorded. As long as no "information" is recorded and only "intentional defects" are present on the C-1 disc 201, the C-1 disc 201 may be regarded as blank. Accordingly, the physical defects on the C-1 disc 201 are used as known information when a disc drive is tested. In addition, the C-1 disc 201 is designed to satisfy the conditions of a phase change recording DVD-RAM which has a capacity of 4.7 gigabytes (GB) prescribed in the "DVD Specifications for Rewritable Disc Version 2.0."

The DMA mirror file provider 203 provides a DMA mirror file which is test reference information including disc definition structure (DDS) information, primary defect list (PDL) information and secondary defect list (SDL) information, as shown in FIG. 1, and satisfying the condition that a supplementary spare area (SSA) is full.

To satisfy the condition that the SSA is full, the test reference DMA mirror file is configured such that a spare area full flag for a primary spare area (PSA) in the PDL is set to "1b" indicating a full state, and such that a spare area full flag for the SSA in the SDL is also set to "1b" indicating a full state.

The PSA is provided at the first part of a user data area on a disc during initialization or reinitialization for primary defects. The PSA remaining after slipping replacement is used for linear replacement. When the PSA is lacking, the SSA is additionally assigned or extended in size during initialization or reinitialization, or while a disc is in use.

Logical sector numbers are not assigned to the PSA and the SSA. The relation between a logical sector number (LSN) and a physical sector number varies with defects on a disc. In other words, since the PSA is assigned one sector from the end of toward the start of a zone whenever a defective sector occurs, the LSN changes. Information on the location of a defective sector which is replaced by slipping replacement is recorded in the PDL.

The SSA is used during linear replacement, in which an error correction code (ECC) block is replaced with a normal block in a spare area when defects (secondary defects) are detected on a disc in use. For the relation between the LSN on a disc and a physical sector number during the linear replacement, when a defect is detected in a sector assigned the LSN as a physical sector number, that is, when the secondary defect is detected, a sector for replacing the defective sector having the LSN is assigned starting from the end of the available SSA. In other words, the defective sector having the LSN is linearly replaced with a sector in a physical spare area. Information on the location of the defective sector which is replaced by linear replacement is recorded in the SDL of the DMA.

The test reference DMA mirror file may be configured such that a spare area full flag is set to a value indicating a full state regardless of whether the PSA and the SSA are filled with data or not according to the above replacement manner.

The reference drive 205 is a modified test recording and reproducing apparatus for testing an apparatus capable of recording information on and reproducing information from a disc. When the C-1 disc 201 is loaded into the reference drive 205 and a test reference DMA mirror file is provided from the DMA mirror file provider 203, the reference drive 205 records the test reference DMA mirror file on the C-1 disc 201 to generate the C-3 disc 207. The test reference DMA mirror file is recorded onto the C-1 disc 201 regardless of physical defects on the C-1 disc 201. Accordingly, the C-3 disc 207 includes the test reference DMA information which is made for the test regardless of the physical defects on the C-1 disc 201 in addition to the physical defects, and thus the test reference DMA information recorded on the C-3 disc 207 is pre-fixed information which is known to the user. The C-3 disc 207 is designed to satisfy the conditions of a phase change recording DVD-RAM which has a capacity of 4.7 GB prescribed in the "DVD Specifications for Rewritable Disc Version 2.0."

When the C-3' disc 211, on which the SSA is extended, is loaded into the reference drive 205, the reference drive 205 immediately reads the DMA information recorded on the C-3' disc 211 and outputs the C-3' disc DMA mirror file 213 based on the DMA information, as test information. The test information may be part of the C-3' disc DMA mirror file 213. Any part of the C-3' disc DMA mirror 213 may be used.

The drive to be tested 209 is a recording and reproducing apparatus which can record information on and reproduce information from a rewritable disc. When the C-3 disc 207 is loaded into the drive to be tested 209, the drive to be tested 209 performs a process in an SSA extension mode. Accordingly, the drive to be tested 209 generates or updates DMA on the C-3 disc 207 to generate the C-3' disc 211 on which the SSA of the C-3 disc 207 is extended. Like the C-1 disc 201, the C-3' disc 211 is designed to satisfy the conditions of a phase change recording DVD-RAM which has a capacity of 4.7 GB.

The C-3' disc 211 generated by the drive to be tested 209 is loaded into the reference drive 205, and thus the test information is output as described above. The test information from the reference drive 205 is provided to the verifier 215. In providing the test information, the reference drive 205 may immediately provide the test information to the verifier 215.

The verifier 215 verifies the C-3' disc DMA mirror file 213 using expected reference information (expected values) on the DMA which is obtained when the drive to be tested 209 normally performs processes on the C-3 disc 207 in the SSA extension mode. The expected reference information may be set by the verifier 215 based on the test reference DMA mirror file provided from the DMA mirror file provider 203 and the physical defect information contained in the previously provided C-1 disc 201. Alternatively, as shown in FIGS. 3A through 3D, DMA information tables may be previously prepared and used.

FIG. 3A shows a check list which the verifier 215 can include for DMA verification. The check items of the list include an error condition of DMA1 through DMA4, DDS/PDL update counters in DDS1 through DDS4 and in SDL1 through SDL4, SDL update counters in SDL1 through SDL4, and contents of DMA1 through DMA4.

The error condition of a DMA item is for checking whether errors exist in DMAs, two of which are located in a lead-in area and two of which are located in a lead-out area. Uncorrectable errors must not exist in any of the four DMAs, DMA1, DMA2, DMA3 and DMA4. If any uncorrectable error is detected in any one of the DMAs, the test result is output to inform the user that the drive to be tested 209 failed in generating or updating the DMA of the C-3 disc 207. When the generation or updating of DMA ends in failure, the user needs to retry the test from the beginning using another test disc.

To verify the DDS/PDL and SDL update counter item upon reinitialization, the values "M+k," which indicate the values of DDS/PDL update counters in four DDSs, i.e., DDS1, DDS2, DDS3 and DDS4, and in four SDLs, i.e., SDL1, SDL2, SDL3 and SDL4, are checked to find whether the value "M" is a previous value and whether the value "k" is "1," because each DDS/PDL update counter value is increased by one when the DDS/PDL is updated or rewritten. The "previous value" means the value of "M" before the drive to be tested 209 performs the extending of the supplementary spare area. It is also checked whether the values of the eight DDS/PDL update counters in the four DMAs, i.e., DMA1, DMA2, DMA3 and DMA4, are the same.

The values "N+k," which indicate the values of SDL update counters in four SDLs, i.e., SDL1, SDL2, SDL3 and SDL4, are checked to find whether the value "N" is a previous value and whether the value "k" is "1," because each SDL update counter value is increased by one when the SDL is updated or rewritten. The "previous value" means the value of "N" before the drive to be tested 209 performs the extending of the supplementary spare area. It is also checked whether the values of the four SDL update counters are the same.

In addition, it is checked whether the contents of the four DMAs, i.e., DMA1, DMA2, DMA3 and DMA4, are the same.

FIG. 3B shows a check list which the verifier 215 can include for verification of the DDS. The check items of the list include a DDS identifier, a disc certification flag, a DDS/PDL update counter, a number of groups, a number of zones, a location of a primary spare area, a location of a first logical sector number (LSN0), a start LSN for each zone, etc.

It is verified that the DDS identifier is "0A0Ah." It is checked whether the value of the bit position b7, which indicates in-progress/not in-progress, in the one byte of the disc certification flag, is "0b." If the value of the bit position b7 is "0b," this indicates that formatting is completed. If the value of the bit position b7 is "1b," this indicates that formatting is in progress. Accordingly, when the value of the bit position b7 is "1b," the verifier 215 determines that formatting has failed. In addition, it is checked whether reserved bit positions b6 through b2 in the disc certification flag are all "0b," and it is checked whether the value of a bit position b1 indicating a user certification flag is "1b." It is also checked whether the value of a bit position b0 indicating a disc manufacturer certification flag is "1b."

To verify the corresponding DDS/PDL update counter, it is checked whether a value M indicating the DDS/PDL update counter value is a previous value, and whether a value k indicating an increment of the DDS/PDL update counter representing a difference in the DDS/PDL update counter "M" before and after a test is "1." It is also checked whether the value of the number of groups is "0001h" indicating that the number of groups is 1, and whether the value of the number of zones is "0023h", indicating that the number of zones is 35.

Moreover, it is checked whether the first sector number in a primary spare area is "031000h," and whether the last sector number in the primary spare area is "0341FFh." It is checked whether the location of LSN0 and the start LSN for every zone, that is, the start LSNs of the second zone, Zone1, through the 35th zone, Zone34, are determined based on the number of defects registered in PDL. The defects registered in the PDL cover the physical defects on the C-1 disc 201 and defects registered in the PDL of the test reference DMA mirror file provided from the DMA mirror file provider 203.

It is checked whether the remaining reserved areas (byte positions 396 to 2047) in the DDS structure are all "00h."

As shown in FIG. 3C, check items for verifying the PDL structure include a PDL identifier, a number of entries in the PDL, an integrity of PDL entries and an un-used area.

It is checked whether the PDL identifier is "0001h." The number of entries in the PDL is the sum of the number of physical defects on the C-1 disc 201 and the number of defects registered in the PDL of the test reference DMA mirror file provided from the DMA mirror file provider 203. For verification of the integrity of each PDL entry, a type of entry and a defective sector number are checked. For the PDL entry type, it is checked whether "00b" indicating a known P-list existing on the C-3 disc 207, "10b" indicating a G1-list of defective sectors detected during user certification, and "11b" indicating the G2-list generated due to the SDL conversion are the same as those in the test reference DMA mirror file. It is checked whether the defective sector numbers in the PDL are written in ascending order. In addition, It is checked whether the un-used area is set to "FFh."

As shown in FIG. 3D, check items for verifying the SDL structure include an SDL identifier, an SDL update counter, a start sector number of a secondary spare area (SSA), a total number of logical sectors, an DDS/PDL update counter, a spare area full flag, a number of entries in the SDL, an integrity of the SDL entries, an un-used area, reserved areas, etc.

It is checked whether the SDL identifier is "0002h." To verify the item of the corresponding SDL update counter, it is checked whether a value N indicating the SDL update counter value is a previous value, and whether a value k indicating an increment of the SDL update counter representing a difference in the DDS/PDL counter "N" before and after a test is "1." To verify the item of the corresponding DDS/PDL update counter, it is checked whether a value M indicating the DDS/PDL update counter value is a previous value, and whether a value k indicating the increment of the DDS/PDL update counter is "1."

It is checked whether the spare area full flag indicates that the secondary spare area is not full because an SSA full flag is set to a value indicating a nonfull state as the drive to be tested 209 extends the SSA.

Figure 4:
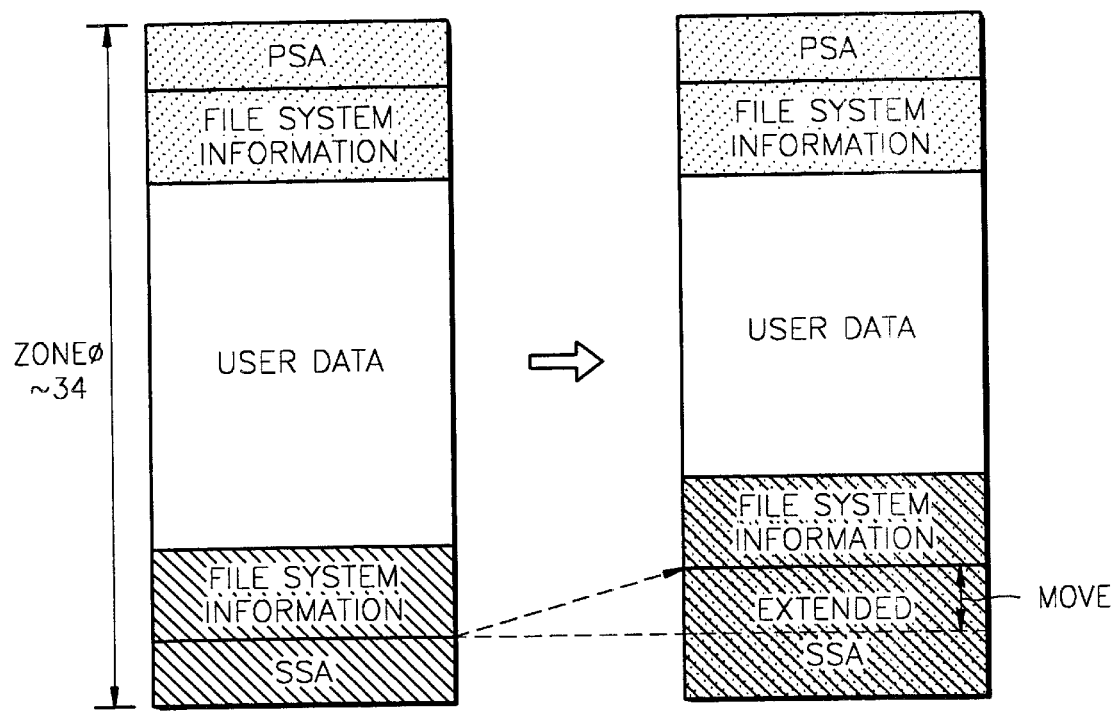
FIG. 4 shows an example of extension of a supplementary spare area.

When the test reference DMA mirror file includes information on an available area for extending the SSA, the drive to be tested 209 is to extend the SSA of the C-3 disc 207 by the predetermined area, as shown in FIG. 4. Accordingly, it is verified whether the extension of SSA is performed normally by checking the start sector number of the SSA and the total number of logical sectors.

When the test reference DMA mirror file includes information on the maximum available SSA, the drive to be tested 209 is supposed to calculate a current SSA and an additionally assignable area for the SSA using the information on the maximum available SSA and extend the SSA. The drive to be tested 209 is also supposed to record the information on the extension in the DDS. Accordingly, it is checked whether this extension is performed normally.

Meanwhile, since the spare area is not assigned an LSN and not included in a file system area, file system information changes when the SSA is extended. This is because the file system information including the size of the file system area is usually recorded on the start and end portions of a volume area, and thus the location at which the file system information is recorded may change as shown in FIG. 4. Accordingly, it is preferable to check whether the file system information is correctly updated when verifying that the SSA is properly extended.

Because the total used area of the SDL is known, if the number of entries in the SDL is checked, the size of the un-used area of the SDL can be determined. Accordingly, it is checked whether the size of the un-used area of the C-3' disc DMA mirror file 213 is equal to the size of the un-used area of the SDL, which is based on the number of entries in the SDL, and also, whether the un-used area is set to "FFh." Also, it is checked whether the expected values of all reserved areas is "00h."

As described above, the verifier 215 verifies whether the drive to be tested 209 normally generates or updates the DMA after extending the SSA according to the DMA read from the C-3 disc 207 by checking whether information contained in the C-3' disc DMA mirror file 213 complies with the predetermined reference information. The result may be displayed for the user. For this, the present invention may include a display unit. Therefore, the user can be informed whether the drive to be tested 209 normally reads and generates or updates DMA information on a disc in the SSA extension mode.

Figure 5:
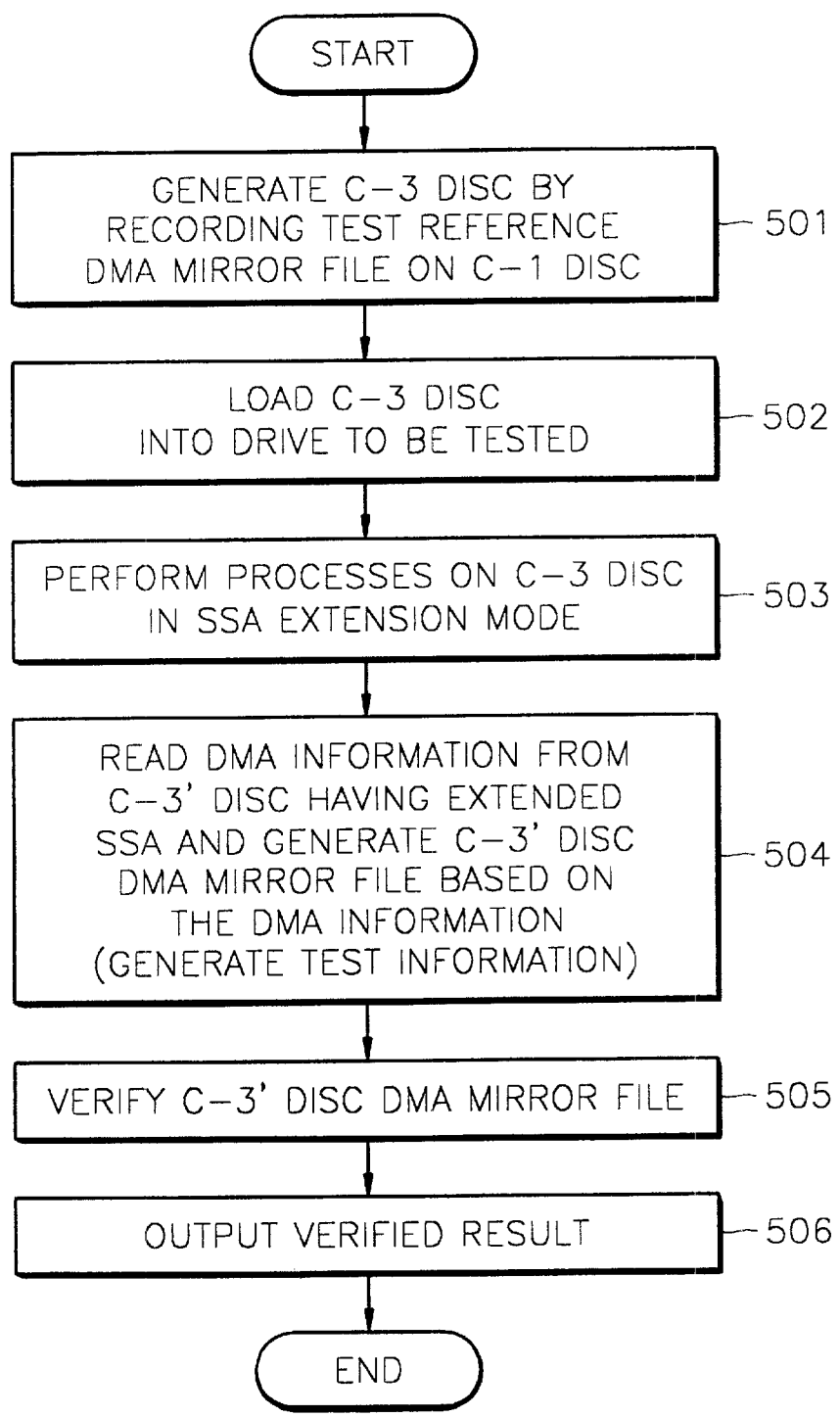
FIG. 5 is a flowchart of a verification method according to the present invention.

FIG. 5 is a flowchart of a verification method according to the present invention. The C-3 disc 207 is generated by recording the test reference DMA mirror file, which has conditions described in FIG. 2, on the C-1 disc 201, which has conditions described in FIG. 2, in operation 501.

Next, the C-3 disc 207 is loaded into the drive to be tested 209 in operation 502. The drive to be tested 209 performs processes on the C-3 disc 207 in a predetermined SSA extension mode, in operation 503. In operation 504, the DMA information is read from the C-3' disc 211 having the extended SSA, and a C-3' disc DMA mirror file 213 is generated based on the DMA information, as test information. The C-3' disc DMA mirror file 213 is verified in operation 505. The verification is performed using expected reference information (or expected values) in the same manner as performed by the verifier 215 described in FIG. 2. After completing the verification, the result of the verification is output in operation 506 so that the user can estimate the performance of the drive to be tested 209.

FIG. 6 shows the drive to be tested 110 having a light source 22 to emit light, a focusing element 24 to focus the light from the light source on a disc D, and a controller 26 which controls the light source 22. The verification process described above seeks to verify the proper operation of the controller 26.

As described above, in the present invention, a drive to be tested performs processes on a test disc (a C-3 disc), which is generated using a blank disc (a C-1 disc) on which no information is recorded, and a reference DMA mirror file for testing an SSA extension, in an SSA extension mode, thereby allowing the user to verify whether the drive to be tested normally reads and generates or updates DMA information in the SSA extension mode. In addition, according to the present invention, the user may personally produce the test disc, thereby reducing the cost by not requiring a manufacturer to produce and provide the test disc. The user may produce the C-3 disc using the reference drive, the DMA mirror file provider, and the C-1 disc.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of verifying a defect management area (DMA) information generation or updating function of a recording and reproducing apparatus which records information on or reproduces information from a disc with DMA information, the method comprising:

extending a supplementary spare area of a test disc in the recording and reproducing apparatus using the test disc which is recorded test reference information in the DMA and generating test information from the test disc having the extended supplementary spare area; and comparing reference information expected from the test reference information with the test information to provide a result of verification of the test information.

2. The method of claim 1, wherein the test reference information is a mirror file.

3. The method of claim 2, wherein the test reference information has a spare area full flag set to a value indicating that the secondary spare area is full.

4. The method of claim 3, wherein the test information is a mirror file.

5. The method of claim 3, wherein the test information is directly read from a DMA on the test disc.

6. The method of claim 5, wherein the comparing comprises:

verifying a structure of the DMA in the test information;

verifying a disc definition structure (DDS) of the test information;

verifying a primary defect list (PDL) structure of the test information; and verifying a secondary defect list (SDL) structure of the test information.

7. The method of claim 6, wherein the verifying of the DMA structure comprises:
- checking whether errors exist in any one of four DMAs, which is the DMA written in four positions on the test disc, two of which are located in a lead-in area and two of which are located in a lead-out area on the test disc;
- checking whether values of DDS/PDL update counters in four DDSs and in four SDLs are "previous values," whether increments of the DDS/PDL update counters representing a difference in the DDS/PDL update counters before and after the extending of the supplementary spare area are "1," and whether the values of the DDS/PDL update counters are the same;
- checking whether values of SDL update counters in the four SDLs are "previous values," whether increments of the SDL update counters representing a difference in the SDL update counters before and after the extending of the supplementary spare area are "1," and whether the values of the SDL update counters are the same; and
- checking whether contents of the four DMAs are the same.

8. The method of claim 6, wherein the verifying of the DDS comprises:
- checking whether a DDS identifier is a predetermined value;
- checking whether a value of bit indicating in-progress in a disc certification flag is "0b" and whether a value of a bit indicating disc manufacturer certification and a value of a bit indicating user certification are "1b";
- checking whether a DDS/PDL update counter value is a "previous value" and whether an increment of the DDS/PDL update counter representing a difference in the DDS/PDL update counter before and after the extending of the supplementary spare area is "1";
- checking whether a number of groups is a predetermined number;
- checking whether a number of zones is a predetermined number;
- checking whether first and last sector numbers of a primary spare area are predetermined sector numbers, respectively;
- checking whether a location of a first logical sector number is determined based on a number of defects registered in the PDL; and
- checking whether a start logical sector number for each zone is determined based on the number of defects registered in the PDL.

9. The method of claim 8, wherein the verifying of the DDS further comprises checking whether remaining reserved areas have a predetermined value.

10. The method of claim 6, wherein the verifying of the PDL structure comprises:
- checking whether a PDL identifier is a predetermined value;
- checking whether a number of entries in the PDL is the same as a number of defects registered in the PDL of the test reference information; and
- checking whether defect lists included in an integrity of the PDL entries are the same as those set in the test reference information.

11. The method of claim 10, wherein the verifying of the PDL structure comprises checking whether an unused area is a predetermined value.

12. The method of claim 6, wherein the verifying of the SDL structure comprises:
- checking whether an SDL identifier is a predetermined value;
- checking whether an SDL update counter value is a "previous value" and whether an increment of the SDL update counter representing a difference in the SDL update counter before and after the extending of the supplementary spare area is "1";
- checking whether a DDS/PDL update counter value is a "previous value" and whether an increment of the DDS/PDL update counter representing a difference in the DDS/PDL update counter before and after the extending of the supplementary spare area is "1";
- checking whether a start sector number of a secondary spare area (SSA) and a total number of logical sectors are properly set according to the size of the SSA which is designated by a user; and
- checking whether a spare area full flag indicates that the SSA is not full.

13. The method of claim 1, further comprising recording the test reference information on a blank disc to generate the test disc.

14. The method of claim 13, wherein the test reference information is recorded on the blank disc regardless of the physical condition of the blank disc.

15. A method of verifying a defect management area (DMA) information generation or updating function of a recording and reproducing apparatus which record information on or reproduces information from a disc with DMA information, the method comprising:
- extending a supplementary spare area of a test disc in the recording and reproducing apparatus using the test disc with test reference information and generating test information from the test disc; and
- comparing reference information expected from the test reference information with the test information to provide a result of verification of the test information,
wherein:
- the extending of the supplementary spare area comprises generating test information such that file system information of the test disc is included in the test information; and
- the comparing comprises verifying whether the file system information included in the test information is correctly updated.

16. An apparatus for testing a defect management area (DMA) information generation or updating function of a recording and reproducing apparatus which records information on or reproduces information from a disc with DMA information, the apparatus comprising:
- a reference drive generating test information from a test disc after the recording and reproducing apparatus performs processes on the test disc having test reference information in the DMA in a supplementary spare area extension mode; and
- a verifier comparing reference information, which is expected from the test reference information, with the test information, to provide a result of verifying the test information.

17. The apparatus of claim 16, wherein the test reference information is a mirror file.

18. The apparatus of claim 17, wherein the test reference information has a spare area full flag set to a value indicating that a secondary spare area is full.

19. The apparatus of claim 18, wherein the test information is a mirror file.

20. The apparatus of claim 18, wherein the test information is extracted from a DMA on the test disc.

21. The apparatus of claim 20, wherein the verifier verifies a structure of the DMA in the test information, a disc definition structure (DDS) in the test information, a primary defect list (PDL) structure in the test information and a secondary defect list (SDL) structure in the test information.

22. The apparatus of claim 21, wherein to verify the DMA structure, the verifier checks whether errors exist in any one of four DMAs, which is the DMA written in four positions on the test disc, two of which are located in a lead-in area and two of which are located in a lead-out area on the test disc, whether values of DDS/PDL update counters in four DDSs and in four SDLs are "previous values," whether increments of the DDS/PDL update counters representing a difference in the DDS/PDL update counters before and after the extending of the supplementary spare area are "1," whether values of the DDS/PDL update counters are the same, whether values of SDL update counters in the four SDLs are "previous values," whether increments of the SDL update counters representing a difference in the SDL update counters before and after the extending of the supplementary spare area are "1," whether the values of the SDL update counters are the same, and whether contents of the four DMAs are the same.

23. The apparatus of claim 21, wherein to verify the DDS, the verifier checks whether a DDS identifier is a predetermined value, whether a value of a bit indicating in-progress in a disc certification flag is "0b," whether a value of a bit indicating disc manufacturer certification and a value of a bit indicating user certification are "1b," whether a DDS/PDL update counter value is a "previous value" and whether an increment of the DDP/PDL update counter representing a difference in the DDS/PDL update counter before and after the extending of the supplementary spare area is "1," checks whether a number of groups is a predetermined value, a number of zones is a predetermine number and first and last sector numbers of a primary spare area are predetermined sector numbers, respectively, and checks whether location of a first logical sector number is determined based on a number of defects registered in the PDL and whether a start logical sector number for each zone is determined based on the number of defects registered in the PDL.

24. The apparatus of claim 21, wherein to verify the PDL structure, the verifier checks whether a PDL identifier is a predetermined value and checks whether a number of entries in the PDL is the same as number of defects registered in the PDL of the test reference information and whether defect lists included in the integrity of PDL entries are the same as those set in the test reference information.

25. The apparatus of claim 21, wherein to verify the SDL structure, the verifier checks whether an SDL identifier is a predetermined value and checks whether an SOL update counter value representing a difference in the SDL update counter before and after the extending of the supplementary spare area is a "previous value," whether an increment of the SDL update counter representing a difference in the SDL update counter before and after the extending of the supplementary spare area is "1," whether a DDS/PDL update counter value is a "previous value," whether an increment of the DDS/PDL update counter representing a difference in the DDS/PDL update counter before and after the extending of the supplementary spare area is "1," whether a start sector number of a secondary spare area (SSA) and a total number of logical sectors are properly set according to a size of the SSA which is designated by a user, and whether a spare area full flag indicates that the secondary spare area is not full.

26. The apparatus of claim 16, wherein the reference drive generates the test information such that file system information of the test disc, on which a supplementary spare area is extended, is included in the test information, and the verifier verifies whether the file system information included in the test information is correctly updated.

27. The apparatus of claim 16, wherein the reference drive records the test reference information on a blank disc to generate the test disc.

28. The apparatus of claim 27, wherein the reference drive records the test reference information on the blank disc regardless of the physical condition of the blank disc.

29. A method of verifying whether defect management area (DMA) information is properly generated or updated in a recording and reproducing apparatus which records or reproduces information on or from an optical disc with the DMA information, the method comprising:

setting a test reference according to a supplementary spare area extension test mode;

generating test information from the DMA information, which is generated or updated by the recording and reproducing apparatus, according to the supplementary spare area extension test mode; and executing a test for verifying the test information using the test reference in the reinitialization test mode.

30. The method of claim 29, wherein the test information is a DMA mirror file.

31. The method of claim 29, wherein the test information is directly read from a DMA area on a disc used for a test.

32. The method of claim 29, wherein the generating of the test information comprises recording pre-fixed contents of a DMA and selecting a DMA mirror file having sufficient secondary defect list (SDL) defects to fill the supplementary spare area.

33. The method of claim 32, further comprising:

obtaining a first test disc by forming known physical defects on a blank disc; and obtaining a second test disc by recording pre-fixed contents of a DMA in the first test disc, and recording a mirror file indicating that the supplementary spare area is full in the first test disc, and using the second test disc in generating the test information.

34. The method of claim 33, wherein the executing of the test comprises checking whether the DMA information of the second test disc complies with a predetermined DMA structure having a predetermined file system.

35. The method of claim 29, wherein the test reference has information on a maximum available amount of a secondary spare area, and executing comprises checking whether a current secondary spare area and additionally assignable spare area using the information on the maximum available amount of the secondary spare area are correctly determined.

36. The method of claim 35, wherein the executing comprises checking whether file system information of the DMA is correctly updated upon the extension of the supplementary spare area.

37. A method of verifying whether defect management area (DMA) information is properly generated or updated in a recording and reproducing apparatus which records or reproduces information on or from an optical disc with the DMA information, the method comprising:

generating test information from the DMA information, which is generated or updated by the recording and reproducing apparatus, according to a supplementary spare area extension test mode; and verifying the test information using a test reference for verifying the DMA information.

38. The method of claim 37, wherein the test information is a DMA mirror file.

39. An apparatus for testing a recording and reproducing apparatus which records or reproduces information on or from a recordable and reproducible optical disc with defect management area (DMA) information to check whether the DMA information is properly generated or updated, the apparatus comprising:

a modified drive unit generating test information from the generated or updated DMA information of a test disc, which is obtained after the recording and reproducing apparatus performs extending a supplementary spare area on the test disc with a DMA mirror file corresponding to the extending of the supplementary spare area; and a verifier comparing the test information with predetermined test information corresponding to the extending of the supplementary spare area to verify a test result.

40. The apparatus of claim 39, wherein the test information is a DMA mirror file.

41. The apparatus of claim 39, wherein the modified drive unit reads the test information from a DMA area on the test disc and provides the test information to the verifier.

42. The apparatus of claim 41, wherein the test disc is a second test disc on which pre-fixed contents of a DMA are recorded in a first test disc on which known physical defects are formed on a blank disc, and on which a mirror file having sufficient secondary defect list (SDL) defects to fill the supplementary spare area is recorded.

43. The apparatus of claim 39, further comprising a DMA mirror file provider which provides the reference test information to the verifier to make the comparison between the test information and the reference test information.

44. The apparatus of claim 39, wherein the DMA mirror file has information on a maximum available amount of a secondary spare area, and the verifier checks whether a current secondary spare area and additionally assignable spare area using the information on the maximum available amount of the secondary spare area are correctly determined.

45. The apparatus of claim 44, wherein the verifier checks whether file system information of the DMA is correctly updated upon the extension of the supplementary spare area.

46. A method of verifying whether a recording and reproducing apparatus reads and processes defect management area (DMA) information properly, comprising:

performing extending a supplementary spare area on a test disc containing predetermined defect information in the DMA indicating that a snare area is full using the reproducing and recording apparatus to generate test information; and comparing the test information with reference test information to determine a verification of the recording and reproducing apparatus.

47. A method of verifying whether a recording and reproducing apparatus reads and processes defect management area (DMA) information properly, comprising:

performing extending a supplementary snare area on a test disc containing predetermined defect information using the reproducing and recording apparatus to generate test information;

comparing the test information with reference test information to determine a verification of the recording and reproducing apparatus;

making known physical defects at predetermined positions in a blank disc, to produce a first test disc;

obtaining a second test disc by recording pre-fixed contents of a DMA in the first test disc, and recording a mirror file having sufficient secondary defect list (SDL) defects to fill the supplementary spare area in the first test disc;

having the recording and reproducing apparatus perform the extending a supplementary spare area on the second test disc, to generate a second test disc with the DMA information; and reading only the DMA information from the second test disc with the DMA information using a reference drive, to generate test DMA mirror file as the test information, wherein the reference test information is a reference DMA mirror file.

48. The method of claim 47, wherein the comparing comprises checking whether the DMA information of the second test disc complies with a predetermined DMA structure, checking whether a P-list is maintained, checking a list of defects which are the same as the known defects of the first test disc, and checking the start logical sector number of each zone of the second test disc.

49. A method of verifying whether a recording and reproducing apparatus properly translates and processes defect information, the method comprising:

preparing a test disc having known physical defects and a test reference DMA mirror file;

generating test information based on having the recording and reproducing apparatus perform extending a supplementary spare area on the test disc; and conducting a verification test on the test information.

50. A method of verifying whether a recording and reproducing apparatus reads and processes defect management area (DMA) information properly, comprising:

performing extending a supplementary spare area on a test disc having known physical defects and a test reference DMA mirror file using the reproducing and recording apparatus to generate the DMA information;

generating test information from the generated DMA information; and comparing the test information with reference test information to determine a verification of the recording and reproducing apparatus.

51. The method of claim 50, wherein the comparing comprises checking a structure of a DMA, a disc definition structure (DDS) of the DMA, a primary defect list (PDL) structure and a secondary list (SDL) structure of the DMA, which form the test information.

52. The method of claim 50, wherein the test reference DMA mirror file has a first spare area full flag indicating that a primary spare area is full, and a second spare area full flag indicating that a secondary spare area full flag is full.

53. DMA information which is properly generated by a recording and reproducing apparatus using the process of:

performing extending a supplementary spare area on a test disc containing known physical defects and a test reference DMA mirror file using the reproducing and recording apparatus to generate the DMA information;

generating test information from the generated DMA information; and comparing the test information with reference test information to determine a verification of the recording and reproducing apparatus.

54. The DMA information of claim 53, wherein the comparing comprises checking a structure of a DMA, a disc definition structure (DDS) of the DMA, a primary defect list (PDL) structure and a secondary list (SDL) structure of the DMA, which form the test information.

55. The DMA mirror information of claim 53, wherein the test reference DMA mirror file has information on a maximum available amount of a secondary spare area, and the comparing comprises checking whether a current secondary spare area and additionally assignable spare area using the information on the maximum available amount of the secondary spare area are correctly determined.

56. The DMA information of claim 55, wherein the comparing comprises checking whether file system information of the DMA is correctly updated upon the extension of the supplementary spare area.

57. The method of claim 55, wherein the comparing comprises checking whether file system information of the DMA is correctly updated upon the extension of the supplementary spare area.

58. A recording reproducing apparatus verified according to the process of:
performing extending a supplementary spare area on a test disc containing known physical defects and a test reference DMA mirror file using the reproducing and recording apparatus to generate the DMA information;
generating test information from the generated DMA information; and
comparing the test information with reference test information to determine a verification of the recording and reproducing apparatus.

59. The recording and reproducing apparatus of claim 58, wherein the comparing comprises checking a structure of a DMA, a disc definition structure (DDS) of the DMA, a primary defect list (PDL) structure and a secondary list (SDL) structure of the DMA, which form the test information.

60. The apparatus of claim 58, further comprising a DMA mirror file provider which provides the reference test information to the verifier to make the comparison between the DMA mirror file and the reference DMA mirror file.

61. The method of claim 58, wherein the test reference DMA mirror file has a first spare area full flag indicating that a primary spare area is full, and a second spare area full flag indicating that a secondary spare area full flag is full.

62. A recording and reproducing apparatus verified according to the process of:
performing extending a supplementary spare area on a test disc containing known physical defects and a test reference DMA mirror file using the reproducing and recording apparatus to generate the DMA information; and
comparing the test information with reference test information to determine a verification of the recording and reproducing apparatus.

63. The recording and reproducing apparatus of claim 62, wherein the comparing comprises checking a structure of a DMA, a disc definition structure (DDS) of the DMA, a primary defect list (PDL) structure and a secondary list (SDL) structure of the DMA, which form the test information.

64. An apparatus for testing a recording and reproducing apparatus which records or reproduces information on or form a recordable and reproducible optical disc with defect management area information to check whether DMA information is properly generated, the apparatus comprising:
a modified driver generating test information based on the DMA information of a test disc generated by a reproducing device performing extending a supplementary spare area on the test disc containing known physical defects and a test reference DMA mirror file using the reproducing and recording apparatus to generate the DMA information; and
a verifier comparing the test information with reference test information to determine a verification of the recording and reproducing apparatus.

65. The apparatus of claim 64, wherein the modified driver reads only the DMA information from the test disc with the DMA information, to generate a DMA mirror file as the test information;
wherein the reference test information is a reference DMA mirror file.

66. The apparatus of claim 64, wherein the modified driver generates a second test disc by recording pre-fixed contents of a DMA on a first test disc having known physical defects, and recording a test reference DMA mirror file having sufficient secondary defect list (SDL) defects to fill the supplementary spare area;
the recording and reproducing apparatus performs the extending of the supplementary spare area on the second test disc, to generate a second test disc with the DMA information; and
the modified driver reads only the DMA information from the second test disc with the DMA information, to generate a test MA mirror file as the test information;
wherein the reference test information is a reference DMA mirror file.

67. The apparatus of claim 66, wherein the verifier checks whether the DMA information of the second test disc complies with a predetermined DMA structure, checks whether a P-list is maintained, checks a list of defects which are the same as the known defects of the first test disc, and checks the start logical sector number of each zone of the second test disc.

68. The apparatus of claim 66, wherein the verifier compares the test information and the reference test information by checking a structure of a DMA, a disc definition structure (DDS) of the DMA, a primary defect list (PDL) structure and a secondary list (SDL) structure of the DMA, which form the test information.

69. The recording and reproducing apparatus of claim 64, wherein the test reference information has a first spare area full flag indicating that a primary spare area is full, and a second spare area full flag indicating that a secondary spare area full flag is full.

70. The recording and reproducing apparatus of claim 64, wherein the test reference DMA mirror file has a first spare area full flag indicating that a primary spare area is full, and a second spare area full flag indicating that a secondary spare area full flag is full.

71. A method of manufacturing a compliant recording and reproducing apparatus, comprising:
manufacturing an uncertified recording and reproducing apparatus that updates and generates defect management area (DMA) information; and
verifying whether the uncertified recording and reproducing apparatus is compliant with a standard, said verifying comprising:
performing extending a supplementary spare area on a test disc containing predetermined defect information and test reference DMA information in the DMA which indicates that a spare area is full using the recording and reproducing apparatus to generate test information, and
comparing the test information with reference test information to determine a verification of the recording and reproducing apparatus, the verification indicating that the uncertified recording and reproducing apparatus is compliant with the standard.

72. The method of claim 71, wherein the test reference DMA mirror file has a first spare area full flag indicating that a primary spare area is full, and a second spare area full flag indicating that a secondary spare area full flag is full.

73. A method of manufacturing a compliant recording and reproducing apparatus, comprising:

manufacturing an uncertified recording and reproducing apparatus that updates and generates defect management area (DMA) information; and verifying whether the uncertified recording and reproducing apparatus is compliant with a standard, said verifying comprising:

performing extending a supplementary spare area on a test disc containing predetermined defect information and test reference DMA information using the recording and reproducing apparatus to generate test information, and comparing the test information with reference test information to determine a verification of the recording and reproducing apparatus, the verification indicating that the uncertified recording and reproducing apparatus is compliant with the standard, wherein the comparing comprises checking a structure of a DMA, a disc definition structure (DDS) of the DMA, a primary defect list (PDL) structure and a secondary list (SDL) structure of the DMA, which form the test information.

74. A disc recording and reproducing apparatus for recording and reproducing information on an optical disc, comprising:

a light source to emit a light;

a focusing element to focus the light onto the optical disc to record and reproduce the information; and a controller to control said light source, said controller being verified to update and generate defect management area (DMA) information by performing extending a supplementary spare area on a test disc containing predetermined defect information and test reference DMA information in the DMA indicating that a spare area is full using the recording and reproducing apparatus to generate test information, and comparing the test information with reference test information to determine the verification of the recording and reproducing apparatus.

75. A disc recording and reproducing apparatus for recording and reproducing information on an optical disc, comprising:

a light source to emit a light;

a focusing element to focus the light onto the optical disc to record and reproduce the information; and a controller to control said light source, said controller being verified to update and generate defect management area (DMA) information by performing extending a supplementary spare area on a test disc containing predetermined defect information and test reference DMA information using the recording and reproducing apparatus to generate test information, and comparing the test information with reference test information to determine the verification of the recording and reproducing apparatus, wherein the comparing comprises checking a structure of a DMA, a disc definition structure (DDS) of the DMA, a primary defect list (PDL) structure and a secondary list (SDL) structure of the DMA, which form the test information.

76. A disc recording and reproducing apparatus for recording and reproducing information on an optical disc, comprising:

a light source to emit a light;

a focusing element to focus the light onto the optical disc for recording and reproducing the information; and a controller to control said light source and to update and generate defect management area information after performing extending a supplementary spare area on the optical disc so that the defect management information is compliant with a standard according to the method of claim 15.

77. A disc recording and reproducing apparatus for recording and reproducing information on an optical disc, comprising:

a light source to emit a light;

a focusing element to focus the light onto the optical disc for recording and reproducing the information; and a controller to control said light source and to update and generate defect management area information after performing extending a supplementary spare area on the optical disc so that the defect management information is compliant with a standard, wherein the controller checks a structure of a DMA, a disc definition structure (DDS) of the DMA, a primary defect list (PDL) structure and a secondary list (SDL) structure of the DMA, which form the test information.

78. A method of manufacturing a compliant recording and reproducing apparatus, comprising:

manufacturing an uncertified recording and reproducing apparatus that updates and generates defect management area (DMA) information; and verifying whether the uncertified recording and reproducing apparatus is compliant with a standard, said verifying comprising:

performing extending a supplementary spare area on a test disc containing predetermined defect information and test reference DMA information using the recording and reproducing apparatus to generate test information, and comparing the test information with reference test information to determine a verification of the recording and reproducing apparatus, the verification indicating that the uncertified recording and reproducing apparatus is compliant with the standard, wherein:

the test reference DMA information includes a DMA mirror file has-having information on a maximum available amount of a secondary spare area, and the comparing comprises checking whether a current secondary spare area and additionally assignable spare area using the information on the maximum available amount of the secondary spare area are correctly determined.

* * * * *

UNITED STATES PATENT AND TRADEMARK OFFICE
CERTIFICATE OF CORRECTION

PATENT NO. : 6,804,797 B2
DATED : October 12, 2004
INVENTOR(S) : Ko et al.

It is certified that error appears in the above-identified patent and that said Letters Patent is hereby corrected as shown below:

Column 8,
Line 42, insert -- on -- after "disc".

Column 10,
Line 26, change "record" to -- records --.

Column 11,
Line 51, change "SOL" to -- SDL --.

Column 13,
Lines 44 and 53, change "snare" to -- spare --.

Column 15,
Line 13, insert -- and -- between "recording" and "reproducing".

Column 18,
Line 53, delete "has-".

Signed and Sealed this

Fifth Day of July, 2005

JON W. DUDAS
*Director of the United States Patent and Trademark Office*